120,688

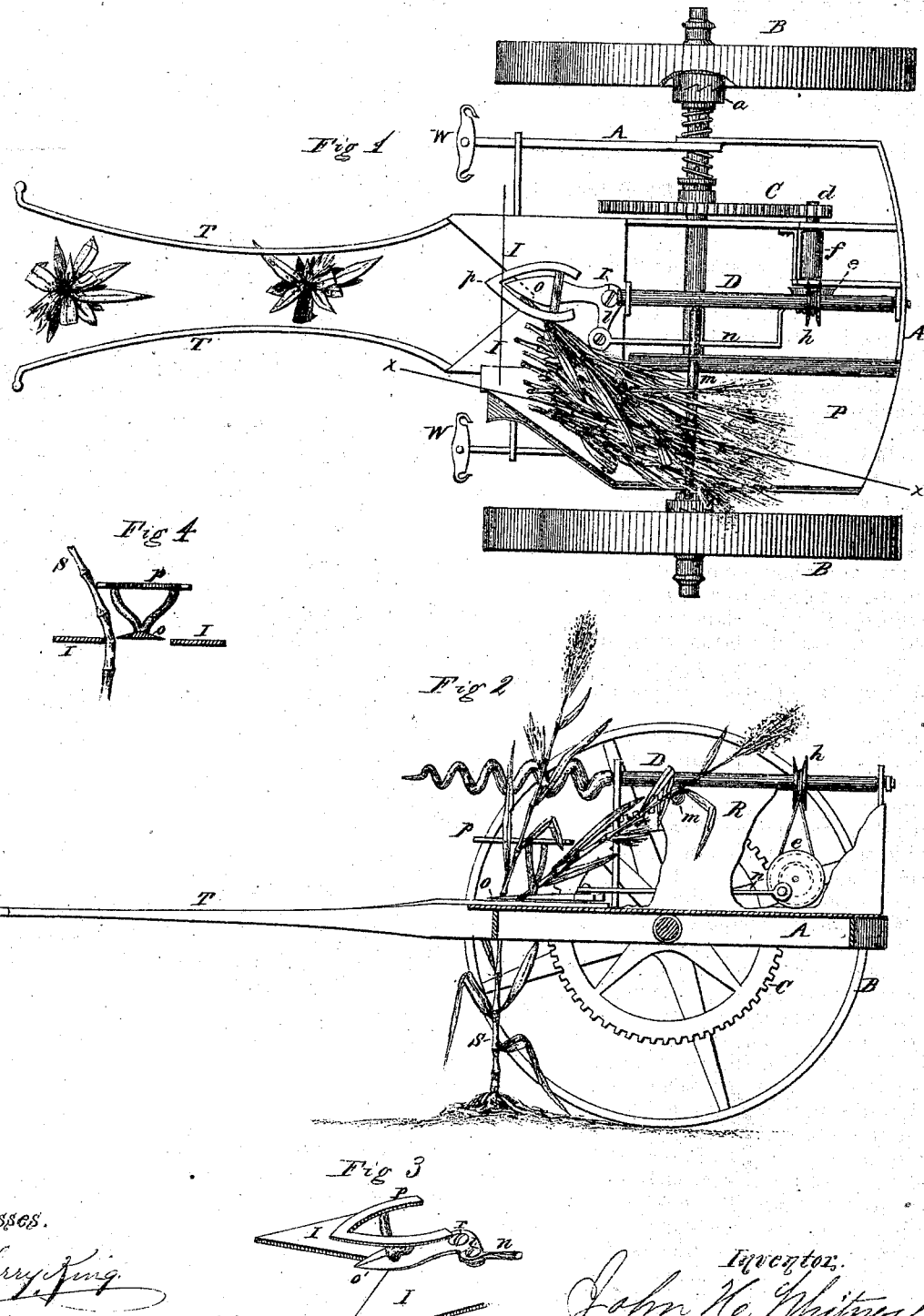

UNITED STATES PATENT OFFICE.

JOHN H. WHITNEY, OF ROCHESTER, MINNESOTA, ASSIGNOR TO HIMSELF AND W. W. MARSH, OF SYCAMORE, ILLINOIS.

IMPROVEMENT IN CORN-HARVESTERS.

Specification forming part of Letters Patent No. 120,688, dated November 7, 1871.

*To all whom it may concern:*

Be it known that I, JOHN H. WHITNEY, of Rochester, in the county of Olmsted and State of Minnesota, have invented certain Improvements in Machines for Harvesting Corn, of which the following is a specification, reference being had to the accompanying drawing.

My invention relates to machines for cutting corn in the field; and the invention consists in a novel construction of the machine as a whole, and of the embodiment therein of several new features, as hereinafter more fully explained.

Figure 1 is a top plan view, and Fig. 2 is a longitudinal vertical section on the line $x\,x$ of Fig. 1. Fig. 3 is a view of a part detached. Fig. 4 represents the operation of bending and cutting the stalk.

In constructing my machine I provide a suitable frame, A, and mount it on two wheels, B, one or both of which are fastened to the axle by means of a spring-clutch, $a$, as shown in Fig. 1, and as is customary in reaping-machines. To enable the machine to be drawn by a team and permit the team to straddle a row of standing corn, instead of the ordinary tongue I provide it with a tongue composed of two separate bars, T, placed at some little distance apart, with their front ends more widely separated, as represented in Fig. 1, thus leaving an uninterrupted space for the stalks back to the cutter. Upon the front of the frame, at each side, is secured a whiffle-tree, W, for attaching the team, as represented. Upon the central front part of the frame I secure a metallic plate, I, having its front cut in the form of a letter V, with its open or wide part to the front; and directly in rear of the apex of this notch I pivot a knife or cutting-blade, $o$, of the form shown in Fig. 1, the point of the knife projecting some distance out into or over the V-shaped notch. This knife has an arm, $l$, to which is connected a rod or pitman, $n$, which is operated by a crank or wrist-pin on a wheel, $e$, attached to a transverse shaft, $f$, which has on its opposite end a pinion, $d$, which is driven by a gear-wheel, $c$, secured upon the axle, as shown in Fig. 1, this mechanism imparting to the knife $o$ a rapid oscillating motion on its pivot $r$. Attached to the knife, but at some distance above it, is a guard, $p$, of a form similar to that of the knife, but of considerably greater width, as represented in Fig. 1, the object of which will be hereinafter explained. In suitable bearings over the knife is mounted a longitudinal shaft, D, which has on it a pulley, $h$, connected by a belt to the pulley $e$ on shaft $f$, by which means this shaft D is rotated. The front end of this shaft D is twisted like a cork-screw, as represented in Fig. 2. Upon one or both sides of the frame is secured a platform, P, with a vertical partition, R, running lengthwise of the machine, and with a raised ledge or box around the side, for receiving the stalks as they are cut. Across the platform, and resting on the raised side, is a cross-bar, $m$, on which the stalks rest as they fall, thus holding them in an inclined position convenient for binding.

The operation of the machine is as follows: The team being hitched to the machine it is drawn along in such a manner as to straddle a row of the stalks as they stand in the field. The revolving shaft D draws the top of the stalk backward toward the knife, and as the latter approaches it the guard $p$, striking the stalk in advance of the knife, because of its greater width, bends the stalk over sidewise, as represented in Fig. 4, against the edge of the plate I, thus presenting it in a bent or inclined position to the edge of the knife, which is thereby enabled to cut it on a slant, and of course to cut it with much greater ease. The stalks as cut fall upon the platform, resting in an inclined position on the bar $m$, where they are bound and thrown upon the ground, the binding-bands being held in a suitable receptacle.

It is obvious that the plate I, instead of being made wholly of metal, may be of wood, with a metal strip secured along its inclined edges; and these inclined edges may also be made sharp to assist in cutting the stalks as they are pressed against them. Both these and the knife may be provided with sickle-teeth or be made smooth, as preferred.

Two seats for binders may be mounted on the frame, one on each side, so that as the corn falls alternately on each side and the other of the machine it can be bound by the respective binders.

By these means I am enabled to construct a very efficient machine.

Having thus described my invention, what I claim is—

1. The combination of the reciprocating guard $p$ with the knife $o$, when arranged to operate as described, whereby the stalks are bent so as to enable the knife to cut them on a slant, as set forth.

2. The arrangement of the screw-shaft D, knife o with its guard p, and the cutter-bars I, all as herein described.

3. The within-described corn-harvester, consisting of a frame mounted on wheels, with the tongue composed of the two bars T, with the inclined cutter-bars I at their rear end, in combination with the oscillating knife o and guard p, all constructed and arranged to operate substantially as set forth.

JOHN H. WHITNEY.

Witnesses:
R. L. DIVINE,
J. L. PRATT.

(75)